US010044682B2

(12) United States Patent
L'Azou et al.

(10) Patent No.: US 10,044,682 B2
(45) Date of Patent: Aug. 7, 2018

(54) TECHNIQUE FOR DISTRIBUTING A PIECE OF CONTENT IN A CONTENT DISTRIBUTION NETWORK

(71) Applicant: ORANGE, Paris (FR)

(72) Inventors: Yves-Rene L'Azou, Trebeurden (FR); Benoit Gaussen, Lannion (FR); Sebastien Cubaud, Rennes (FR)

(73) Assignee: Orange, Paris (FR)

( * ) Notice: Subject to any disclaimer, the term of this patent is extended or adjusted under 35 U.S.C. 154(b) by 62 days.

(21) Appl. No.: 14/893,500

(22) PCT Filed: May 28, 2014

(86) PCT No.: PCT/FR2014/051259
§ 371 (c)(1),
(2) Date: Nov. 23, 2015

(87) PCT Pub. No.: WO2014/191683
PCT Pub. Date: Dec. 4, 2014

(65) Prior Publication Data
US 2016/0112380 A1    Apr. 21, 2016

(30) Foreign Application Priority Data
May 28, 2013  (FR) ...................................... 13 54777

(51) Int. Cl.
*H04L 29/06* (2006.01)
*H04L 9/32* (2006.01)
(Continued)

(52) U.S. Cl.
CPC ........ *H04L 63/0428* (2013.01); *H04L 63/061* (2013.01); *H04L 63/0823* (2013.01); *H04L 63/126* (2013.01)

(58) Field of Classification Search
CPC .............. H04L 63/0428; H04L 63/061; H04L 63/0823; H04L 63/126
(Continued)

(56) References Cited

U.S. PATENT DOCUMENTS

| 8,220,035 B1 * | 7/2012 | Pravetz | ............... H04L 63/1483 715/749 |
| 2005/0074126 A1 * | 4/2005 | Stanko | ................ H04L 63/0807 380/279 |

(Continued)

FOREIGN PATENT DOCUMENTS

WO     2005/003934 A1    1/2005

OTHER PUBLICATIONS

Enclosed please find the Written Opinion for the application PCT/FR2014/050653.
(Continued)

*Primary Examiner* — Aravind K Moorthy
(74) *Attorney, Agent, or Firm* — Haverstock & Owens LLP

(57) ABSTRACT

A method for distributing a piece of content in a content distribution network, provided by a source entity of which the integrity is ensured by means of a private key, the method comprising the following steps implemented by a content distribution entity: —receiving a request to access the piece of content from a user device; —sending, to a proxy entity, a request to have at least one piece of data signed by means of the private key; —receiving the at least one piece of signed data, the at least one piece of signed data certifying the integrity of said distribution entity for the user device; —sending a public key associated with the private key to the user device; —sending the at least one piece of signed data to the user device and distributing the content to the user device.

10 Claims, 6 Drawing Sheets

(51) Int. Cl.
*G06F 7/04* (2006.01)
*G06F 17/00* (2006.01)

(58) Field of Classification Search
USPC .................. 713/171, 165; 726/10, 12, 26
See application file for complete search history.

(56) References Cited

U.S. PATENT DOCUMENTS

| | | | |
|---|---|---|---|
| 2006/0004662 A1* | 1/2006 | Nadalin .................. | H04L 63/02 705/50 |
| 2009/0222903 A1* | 9/2009 | Sherkin ............... | G06F 21/6218 726/10 |
| 2010/0299525 A1 | 11/2010 | Shah Paras et al. | |
| 2013/0191882 A1* | 7/2013 | Jolfaei ................ | H04L 63/0807 726/4 |
| 2014/0208119 A1* | 7/2014 | Chang .................. | H04L 9/3213 713/176 |

OTHER PUBLICATIONS

T Dierks et al., "The Transport Layer Security (TLS) Protocol Version 1.2", Network Working Group, Aug. 31, 2008, XP002721348.
A Freir et al., "The Secure Socket Layer (SSL) Protocol Version 3.0", Internet Engineer Task Force, Aug. 31, 2011, XP002721349.
The International Search Report from PCT/FR2014/051259.

\* cited by examiner

TECHNIQUE FOR DISTRIBUTING A PIECE OF CONTENT IN A CONTENT DISTRIBUTION NETWORK

CROSS-REFERENCE TO RELATED APPLICATIONS

This Application is a Section 371 National Stage Application of International Application No. PCT/FR2014/051259, filed May 28, 2014, which is incorporated by reference in its entirety and published as WO 2014/191683 on Dec. 4, 2014, not in English.

FIELD OF THE INVENTION

The invention lies in the field of the distribution of content in a distribution network (in English CDN for Content Delivery Network), and more particularly concerns a method for secure distribution, through delegation between content distribution networks, of a content provided by a source entity whose integrity is guaranteed by means of a private key.

BACKGROUND OF THE DISCLOSURE

It is known practice for an operator to use content distribution networks for distributing content in a communication network. Generally, these networks comprise source entities and sink entities for replicated content, subsequently called entities for distributing a content. The source entities provide content that are duplicated according to their popularity, for example, on sink entities situated close to the recipients of this content. They thus allow the source entities not to be called upon and forwarding costs to be decreased.

In order to guarantee the integrity and the origin of a content, it is likewise known practice for an operator to implement a secure interchange protocol, such as the HTTPS (HyperText Transfer Protocol Secure) protocol, in a content distribution network. The latter protocol allows security to be provided for HTTP (HyperText Transfer Protocol) interchanges by means of an SSL/TLS (Secure Sockets Layer/Transport Layer Security) protocol layer for providing security for interchanged data. The SSL/TLS layer primarily performs three roles:

authenticate the entities taking part in the interchange,
ensure the confidentiality of interchanged data,
guarantee the integrity of interchanged data.

The authentication allows the identity of the entities taking part in the interchange to be guaranteed. It is implemented by means of certificates issued by a certification authority, which allow the identity of an entity to be proved to a third-party entity. A relationship of trust can thus be established between the entity for which a certificate has been issued and the third-party entity which needs to communicate with said entity.

The SSL and TLS protocols, and more particularly the SSL/TLS negotiation (Handshake protocol), are described in the document Request for Comments 6101 and 5246 from the IETF (Internet Engineering Task Force). This negotiation consists, for two entities wishing to establish secure communication, in negotiating common keys and encryption protocols, allowing their interchanges to be encrypted. For this, the two entities, the client and the server, first of all interchange a Hello message in order to agree on the authentication and encryption algorithms that they will use. The server entity then sends its certificate to the client entity. This certificate contains information about the entity that holds it, information associated with the authority that has issued it (name of the authority, validity of the certificate, etc.), a public encryption key and a signature. The server entity has a private key associated with the certificate. The client entity checks the authenticity of the certificate and the integrity of the server entity by means of the public encryption key and the signature of the certificate. The client entity then produces a generation key, called "premaster secret", which it transmits to the server entity, encrypted using the public encryption key. The server entity decrypts the received generation key by means of the private key associated with the certificate. From this generation key, the client and server entities generate one or more common session keys that allow their interchanges to be provided with security.

The method for setting up a secure session as provided for in RFC 5246 and 6101 thus requires access to the private key that is known only to the entity for which a certificate has been issued. It is possible for a certified source entity providing a content to delegate the distribution of said content to distribution entities of a content distribution network. In this case, the certificate of the certified entity and the private key must be provided for the content distribution network. The latter, which is the custodian of the content to be distributed, can thus distribute it transparently to the entity that requires it. It may be advantageous for this proxy content distribution network to itself turn to another content distribution network. This allows the proxy network to benefit from the proximity of the entities for distributing a content of the third-party content distribution network vis-à-vis the recipients of this content. However, within a secure interchange context, it is generally prohibited for the content distribution network having obtained authorization for a certified entity to communicate the private key to a third party. In the prior art, it is thus impossible for a third-party distribution network keeping a content to be distributed to distribute it in a secure manner to an entity that requires it if it does not have the private key associated with the certified entity. The identity of the certified entity and the integrity of the content therefore cannot be guaranteed, the effect of which is that it is not possible to establish a relationship of trust between the entity requiring the content and the third-party distribution network that is the custodian thereof.

SUMMARY

One of the aims of the invention is to overcome inadequacies/disadvantages of the prior art and/or to make improvements thereto.

According to a first aspect, the invention concerns a method for distributing, in a content distribution network, a content that is provided by a source entity whose integrity is guaranteed by means of a private key, said method comprising the following steps implemented by an entity for distributing a content:

reception of an access request for said content from a client entity;

sending, to a proxy entity, of a request for signature of at least one datum by means of the private key;

reception of said at least one signed datum, said at least one signed datum certifying the integrity of said distribution entity for the client entity;

sending of a public encryption key associated with the private key to the client entity;

sending of said at least one signed datum to the client entity and distribution of the content to the client entity.

The sending of a signature request allows an entity for distributing a content to ask a reputedly reliable proxy entity to vouch for its integrity. Since the entity for distributing a content is then recognized as an entity of integrity, it is thus possible to use it to distribute a content with a guarantee about the source entity that has provided this content. The method for distribution thus allows an uncertified entity to distribute a content to a client entity that wishes to receive it with a guarantee about its transmitter. In other words, the method for distribution allows the requester of content to be assured that said content comes from a source of integrity. The recourse to a third-party proxy entity in order to obtain the signature likewise has the advantage of exempting the distribution entity from a prior distribution agreement with the content provider. Since the private key is not transmitted from one entity to another, the confidentiality of the private key associated with the certificate issued to the content provider is moreover not endangered. This containment of the private key moreover protects it from possible fraudulent use.

The various embodiments or implementation features mentioned below can be added, independently or in combination with one another, to the steps of the method for distribution as defined above.

According to one particular feature, the method for distribution comprises the following steps:

reception of said content and of said public encryption key for subsequent distribution of said content;

reception of a processing information item associated with said content indicating that the processing operations requiring the private key are performed by said proxy entity.

The processing information associated with the content distinguishes the content requiring secure distribution from the other content. By way of example, the processing information relates to the sensitivity of the content to be distributed, or else to the reputation of the entity at the source of the content. Therefore, it notably allows the selection of a distribution policy linked to the reputation of the entity at the source of the content, or else that is dependent on the sensitivity of the content to be distributed.

According to another particular feature, the method for distribution comprises the following steps:

reception of a generation key encrypted by means of said public encryption key from the client entity;

sending of said generation key to be decrypted to said proxy entity;

reception of said decrypted generation key from said proxy entity;

generation of at least one session key from said generation key, said at least one session key being intended to be used to provide security for interchanges between said distribution entity and said client entity.

The sharing of a generation key between the user equipment and the distribution entity allows these to generate one or more common session keys, which are used in order to encrypt their interchanges. The confidentiality of the interchanges between the user equipment and the distribution entity is thus assured. Since the generation key is transmitted in a form encrypted by means of a public encryption key, the distribution entity moreover cannot produce session keys without first having requested decryption thereof from a proxy entity having the private key associated with the public encryption key. The setup of secure communication is therefore impossible without the approval of the trusted entity. As a result the security of the interchanges is reinforced. From the point of view of the client entity, the method allows transparent distribution of the content via secure communication with the distribution entity. The method for distribution renders the distribution entity invisible to the client entity, which appears to converse with the entity at the source of the content for a single interlocutor. It should furthermore be noted that this transparent interchange is completely independent of the number of intermediate distribution entities involved in the distribution of a content between a certified source entity and the client entity.

According to a second aspect, the invention concerns a method for delegation by a proxy entity in order to distribute a content to a client entity, the proxy entity having a private key guaranteeing the integrity of a source entity providing the content, said method comprising the following steps implemented by the proxy entity:

reception, from a distribution entity, of a content of a request for signature of at least one datum by means of said private key, said request relating to distribution of the content to the client entity;

sending, to the distribution entity, of said at least one signed datum, said at least one signed datum certifying the integrity of said distribution entity for distributing a content for the client entity and being intended to be sent to the client entity.

The advantages stated for the method for distributing a content according to the first aspect can be transferred directly to the method for delegation according to the second aspect. Delegation allows the use of distribution resources that are not qualified to distribute the content in the prior art. By way of example, these distribution resources are uncertified entities (entities to which no certificate has been issued) of a third-party content distribution network. The method for delegation thus allows a content distribution network to delegate the distribution of a content to another content distribution network. The method for delegation notably allows the distribution of a content to be optimized, and there to be a contribution to the overall improvement of the quality of service linked to the distribution of a content. By way of example, a proxy entity of a content distribution network A can benefit from an entity of a content distribution network B that is situated in immediate geographical proximity to a client entity that has requested a content, by delegating the distribution of the content to the latter.

According to one particular feature, the method for delegation likewise comprises the following steps:

sending of a content and of a public encryption key for subsequent distribution of the content to a client entity;

sending of an information item associated with said content indicating that the processing operations requiring said private key are performed by said proxy entity.

According to another particular feature, the method for delegation moreover comprises the following steps:

reception of a generation key to be decrypted from the distribution entity;

decryption of said generation key;

sending of said decrypted generation key to said distribution entity.

According to another particular feature, the method for delegation moreover comprises establishment of a relationship of trust with the entity for distributing a content prior to the sending of said at least one signed datum.

The bond of trust established in this manner allows transparent interchange vis-à-vis the client entity requesting the content. The client entity has the impression that it is conversing with the entity at the source of the content. This bond of trust moreover facilitates the deployment of content distribution systems capable of distributing content securely. This is because it avoids the negotiation of complex agreements between network operators, content providers and distribution networks.

According to a third aspect, the invention concerns an entity for distributing a content, in a content distribution network, said content being provided by a source entity whose integrity is guaranteed by means of a private key, said distribution entity comprising:

a first sending/receiving module, designed to receive an access request for a content from a client entity, and to send said client entity a public encryption key, and at least one signed datum in order to distribute the content to said client entity;

a second sending/receiving module, designed to send a proxy entity a request for signature of said at least one datum by means of a private key, and to receive said at least one signed datum in response to said request, said at least one signed datum certifying the integrity of said entity for distributing a content for the client entity.

The advantages presented for any one of the particular features according to the first aspect can be transferred directly to the distribution entity according to the third aspect. The distribution entity has the advantage of being able to be easily integrated into an existing content distribution network. The entity for distributing a content can notably be integrated into a content distribution network comprising both known distribution entities from the prior art and distribution entities according to the invention. There is no need for any serious modification of the infrastructures, and the deployment of distribution entities according to the invention, within an existing content distribution network, is easy. The invention means that it is therefore possible to simply add functionalities for providing security for interchanges to an existing content distribution network.

According to one particular feature, the second sending/receiving module of the entity for distributing a content is likewise designed to receive, from an entity belonging to a content distribution network, a content and a processing information item for said content, as well as at least one public encryption key.

According to another particular feature, the first sending/receiving module and the second sending/receiving module of the entity for distributing a content are respectively designed to receive from a client entity an encrypted generation key and to send said encrypted generation key to the proxy entity for decryption;

said entity moreover comprising:

a computation module, designed to generate at least one session key from said generation key, said at least one session key being intended to be used in order to provide security for interchanges with the client entity.

According to a fourth aspect, the invention concerns a proxy entity, storing in memory a private key guaranteeing the integrity of a source entity providing a content, said entity comprising:

a sending/receiving module, designed to receive, from an entity for distributing a content, a request for signature of at least one datum by means of said private key, said request relating to distribution of the content to a client entity, and to send said distribution entity said at least one signed datum, said at least one signed datum certifying the integrity of said distribution entity for the client entity and being intended to be sent to the client entity.

According to one particular feature, the sending/receiving module of the proxy entity is likewise designed to send a content and a processing information item for said content, as well as at least one public encryption key, to an entity for distributing a content.

According to another particular feature, the sending/receiving module of the proxy entity is likewise designed to receive an encrypted generation key from an entity for distributing a content, and, subsequent to the decryption of said key, to return it in decrypted form to said distribution entity.

According to a fifth aspect, the invention proposes a system in a content distribution network, said system comprising:

at least one entity for distributing a content according to the third aspect;

a proxy entity according to the fourth aspect.

According to a sixth aspect, the invention likewise concerns a program for an entity for distributing a content, comprising program code instructions that are intended to control the execution of the steps of the method for distribution described above when said program is executed by said entity and a recording medium that can be read by an entity for distributing a content on which a program for an entity for distributing a content is recorded.

According to a seventh aspect, the invention likewise concerns a program for a proxy entity, comprising program code instructions that are intended to control the execution of the steps of the method for delegation described above when said program is executed by said entity and a recording medium that can be read by a proxy entity on which a program for a proxy entity is recorded.

BRIEF DESCRIPTION OF THE DRAWINGS

The invention will be better understood with the aid of the following description of particular embodiments, with reference to the appended drawings, in which.

DETAILED DESCRIPTION OF ILLUSTRATIVE EMBODIMENTS

Figure 1A:
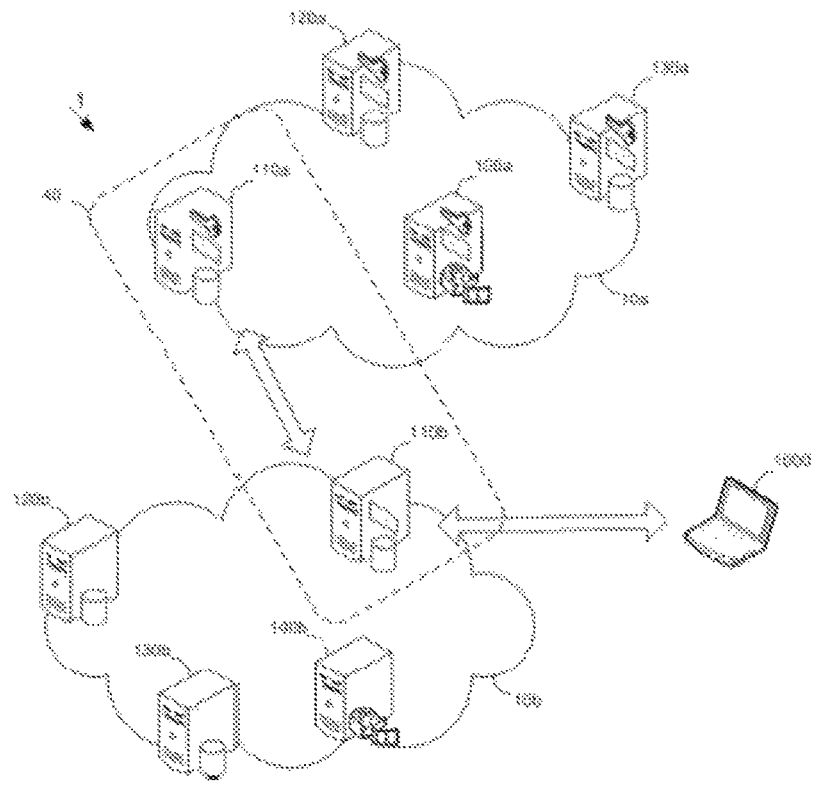
FIGS. 1a and 1b show a system for distributing content in a communication network according to two particular embodiments.

FIG. 1a shows a system for distributing a content in a communication network 1. As FIG. 1a shows, the network 1 is made up of two content distribution subnetworks 10a and 10b. The networks 10a and 10b are content distribution networks. These networks have source entities 100a and 100b by means of which the content to be distributed is introduced. The network 10a comprises entities for distributing a content according to the prior art 120a, 130a. The network 10b comprises entities for distributing a content according to the invention 110b and according to the prior art 110b, 120b and 130b.

The source entities 100a-b are generally remote from the client entities. This remoteness can give rise to high forwarding costs. The distribution entities 120a, 130a, 110b, 120b, 130b are used to cache content, by storing in memory at least some of the content of a website. More precisely, they allow local and temporary memory storage of content requested by a client entity 1000. The distribution entities 120*a*, 130*a*, 110*b*, 120*b*, 130*b* are dedicated to this function for caching content and are used to replicate entire content of one or more source entities 100*a*-*b*. They particularly allow, according to the number of distribution entities deployed and their localization in the network, reduction of network congestion at the source entities 100*a*-*b*. This is because the latter can be the subject of a very high number of demands directly linked to the popularity of the content that they store in memory. Moreover, the distribution entities are generally placed closest to the client entities so as to reduce delays of accessing the sought content. In the present embodiment, the content distribution network 10*a* relies on the distribution network 10*b*. By comparison with the distribution entities 120*a*, 130*a* of the content distribution network 10*a*, the distribution entities 110*b*, 120*b* and 130*b* benefit from better geographical proximity vis-à-vis the client entity 1000, which allows optimization of the distribution of content to the client entity 1000.

The network 10*a* is in possession of a private key associated with a certificate signed by a third-party authority, which is likewise known by the name of PKI for Public Key Infrastructure. By way of example, this certificate is an electronic certificate compliant with the X.509 standard. Each entity of the network 10*a* has the private key associated with the certificate that is issued for the website. The entities of the network 10*b* cannot access the private key, the latter being confined to the network 10*a*. The distribution network 10*a* moreover comprises a proxy entity 110*a*.

In the embodiment described, a client entity 1000 requests access to a content in a secure manner. By way of example, the client entity is a personal computer, a telephone or else a tablet. By way of example, the content is a video, music, a data file or else an internet page. It is stored in memory by an entity for distributing a content 110*b* of the network 10*b*. In order to meet the request from the client entity 1000, the distribution entity 110*b* and the client entity 1000 will set up a session for secure interchange of HTTPS type. The distribution entity 110*b*, although having the content, does not have access to the private key associated with the transmitter of the content and cannot set up a secure interchange. The distribution entity 110*b* asks the proxy entity 110*a* of the distribution network 10*a* to vouch for it. The distribution entity 110*b* then distributes the requested content to the client entity 1000 under the authorization of the proxy entity 110*a*.

In one particular embodiment, a distribution entity may likewise be a proxy entity, and vice versa.

In another embodiment, the distribution entity and the proxy entity form part of one and the same content distribution network. In this case, only some entities of one and the same content distribution network access a private key.

Figure 1B:
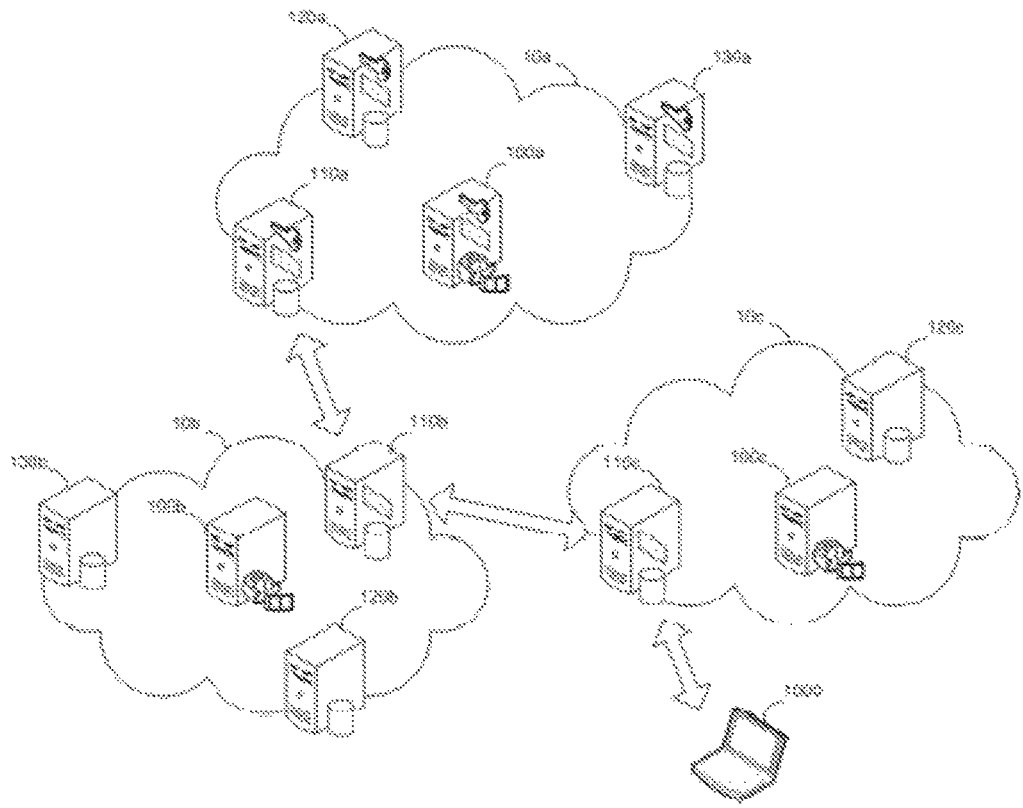

FIG. 1*b* shows another embodiment of the system described above, in which the delegation is made in cascaded fashion from a first distribution network 10*a* having a proxy entity 110*a* to a second distribution network 10*c*, by going through a third intermediate distribution network 10*b*. The entity of the intermediate distribution network 10*b* taking action in the delegation is in this case adapted to be able to relay the request to the proxy entity 110*a* to vouch for the distribution entity 110*c*.

Figure 2:
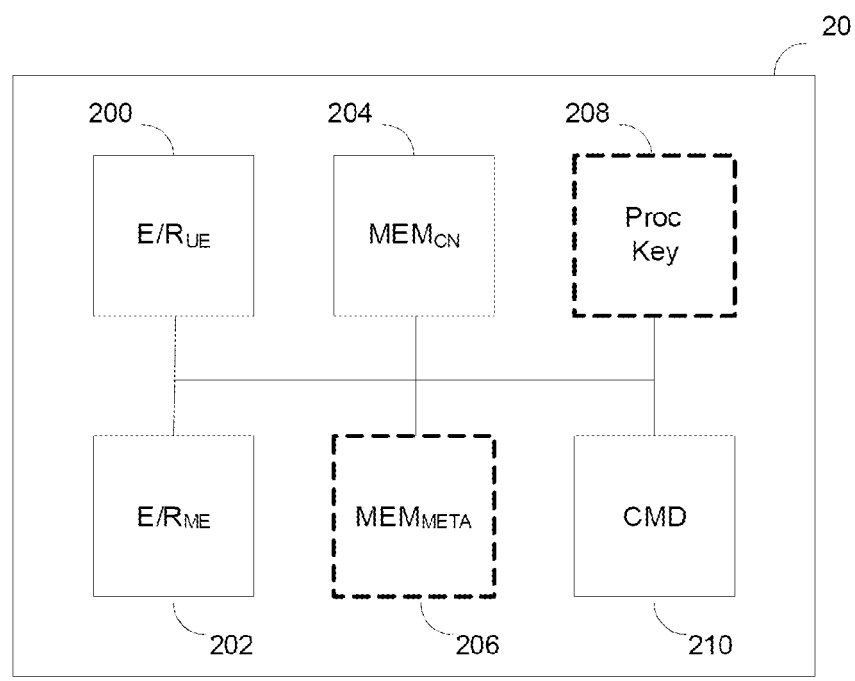
FIG. 2 shows an entity for distributing a content according to a particular embodiment.

FIG. 2 shows an entity for distributing a content 20 according to a particular embodiment. It notably comprises:

a first transmission/reception module 200, designed to receive an access request for a content from a client entity, and to send said client entity a public encryption key, and at least one signed datum in order to distribute the content to said client entity;

a second sending/receiving module 202, designed to send a proxy entity a request for signature of at least one data by means of a private key, and to receive this signed datum in response, this signed datum certifying the integrity of the entity for distributing a content for the client entity;

first memory storage means 204, designed to store said content in memory;

second memory storage means 206, designed to store a processing information item for the content and at least one public encryption key in memory;

a computation module 208, designed to generate at least one session key from a generation key, this session key being intended to be used to provide security for interchanges with the client entity;

a processing module 210, designed to process an access request for the content.

The first sending/receiving module 200 is likewise designed to receive from a client entity a generation key encrypted by means of a public encryption key.

The second sending/receiving module 202 is likewise designed to receive, from an entity belonging to a content distribution network, a content and a processing information item for this content, as well as at least one public encryption key, and to send an encrypted received generation key to the proxy entity for decryption.

By way of example, the first 204 and second 206 memory storage means are a memory storage area, a buffer area (or "buffer") or else an external hard disk.

In another embodiment, the distribution entity 20 has no memory storage means 206. The processing information item indicating that the processing operations requiring the private key are performed by the proxy entity 30 is relayed via the access request for the content, for example, from the client entity.

In another embodiment, the distribution entity 20 comprises no computation module 208 for generating a session key from a generation key. In this case, the distribution entity 20 can certify the integrity of the entity at the source of the content, but is unable to encrypt interchanges of the client entity 1000.

Figure 3:
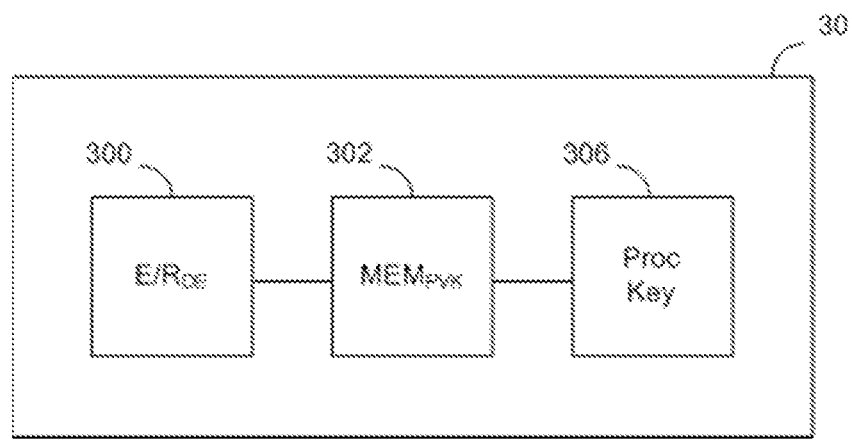
FIG. 3 shows a proxy entity according to a particular embodiment.

FIG. 3 shows a proxy entity 30 according to a particular embodiment. It notably comprises:

a sending/receiving module 300, designed to receive, from an entity for distributing a content, a request for signature of at least one datum by means of the private key, this request relating to distribution of the content to a client entity, and to send the signed datum to this entity for distributing a content, the signed datum certifying the integrity of this entity for distributing a content for the client entity and being intended to be sent to the client entity;

memory storage means 302, designed to store the private key in memory;

a computation module 306, designed to process a signature request and a request for decryption by means of the private key.

The sending/receiving module 300 is likewise designed to:

send a content and a processing information item for the content, as well as a public encryption key, receive an encrypted generation key from an entity for distributing a content, following decryption of the generation key, return it in decrypted form to the distribution entity.

By way of example, the memory storage means 302 are a memory area, a buffer area (or "buffer") or else an external hard disk.

In one particular embodiment, the proxy entity 30 does not send any processing information for the content to the distribution entity 20. In this case, the distribution entity obtains this information from the access request for the content of the client entity 1000, for example.

In another embodiment, the computation module 306 of the proxy entity 30 is not designed to process a decryption request. In this case, the proxy entity 30 provides only a guarantee of the integrity of the entity at the source of the content.

Figure 4A:
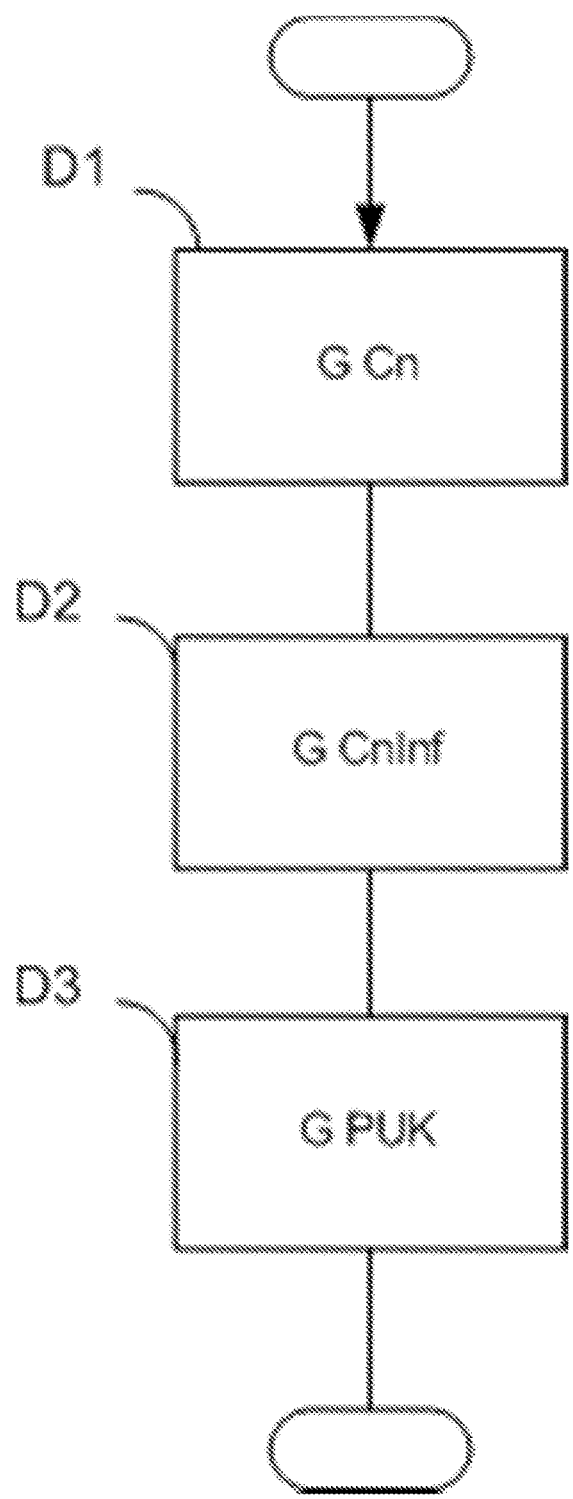
FIGS. 4a and 4b show steps of a method for distributing a content in a particular embodiment.
Figure 4B:
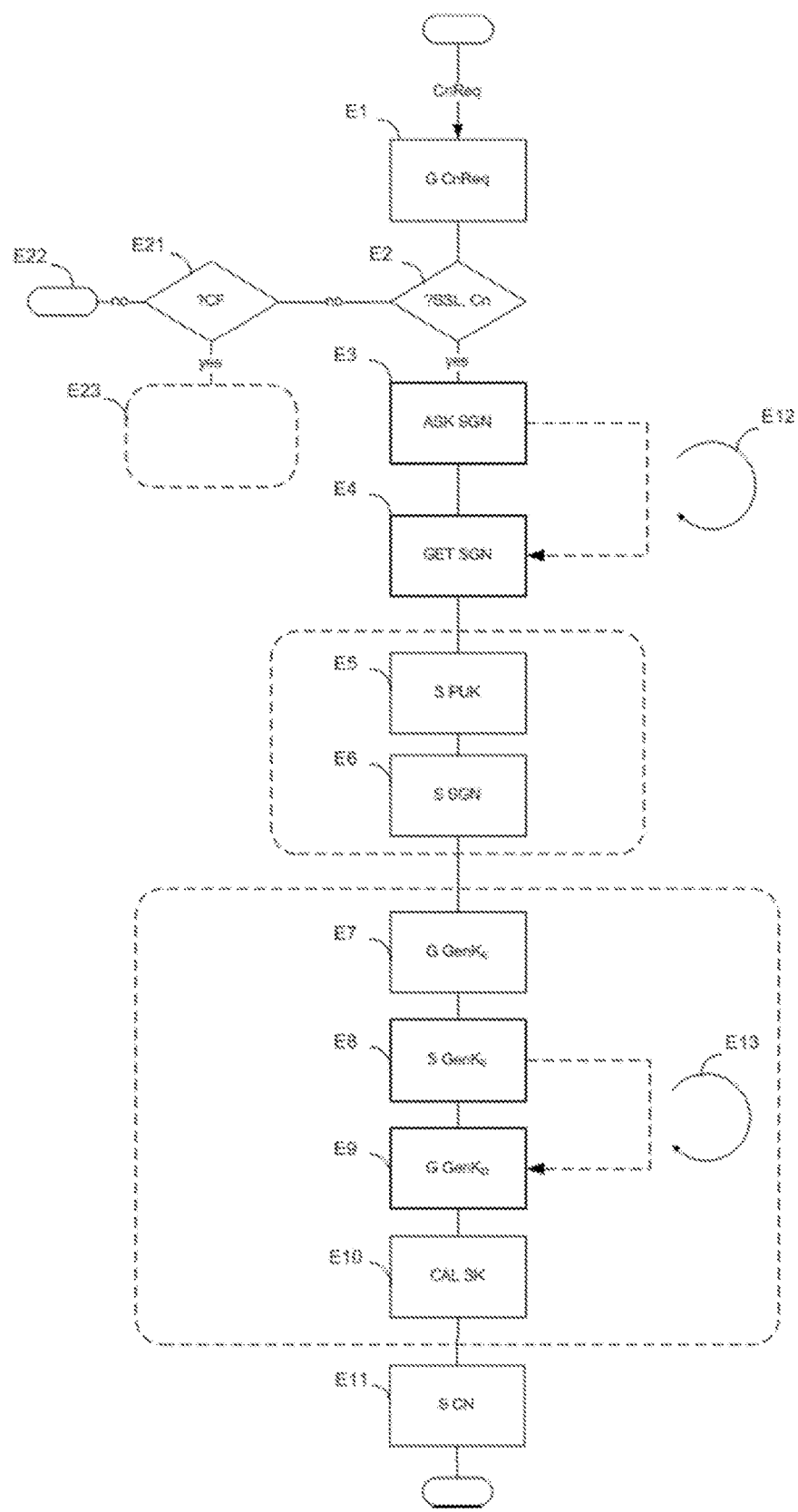

FIGS. 4a and 4b describe the steps of the method for distributing a content that are implemented by the distribution entity 20 in order to distribute a content in a secure manner to a client entity.

In a step D1, the distribution entity 20 receives a content Cn from an entity of a content distribution network. This content is stored in memory by the distribution entity 20 in order to be subsequently distributed to a client entity. The content Cn is moreover associated with a processing information item for the content received in a step D2. By way of example, this processing information item is a Boolean indicating whether or not the content Cn requires processing operations requiring the use of a private key when it is distributed to a client entity. In a step D3, the distribution entity 20 receives a public encryption key associated with this private key. These two keys form a pair of asymmetric keys, one used for encrypting and the other for decrypting data. By way of example, the public encryption key is transmitted by means of an electronic certificate compliant with the X.509 standard.

It should be noted that in another embodiment, steps D1, D2 and D3 are optional. Steps D1, D2 and D3 allow the distribution entity 20 to be presupplied with content that can be distributed to a client entity.

In a step E1, the distribution entity 20 receives a request CnReq for secure access to a content Cn. In this embodiment, the access request is particularly an HTTPS request.

The distribution entity 20 then checks in a step E2 whether a piece of processing information associated with the content is available. This information indicates whether or not the content requires the services of a proxy entity 30 in order to be distributed in a secure manner.

If the content is not identified as requiring the services of the proxy entity 30, the distribution entity 20 checks in a step E21 whether it has a private key locally that allows it to meet the access request for the content that has been transmitted by the client entity.

If this is not the case, the content cannot be distributed using HTTPS and the distribution method stops in a step E22.

Otherwise, that is to say if the distribution entity 20 accesses a private key locally that allows it to negotiate a secure interchange with the client entity, it distributes the content to the client entity in a step E23 using the method known from the prior art that is outlined in RFC 5246 mentioned above.

If the content is identified as requiring the services of the proxy entity 30, in a step E3, the distribution entity 20 sends a signature request to the proxy entity 30. More precisely, the distribution entity 20 sends its signature request after having negotiated with the client entity 1000, during the interchange of a Hello message, the authentication and encryption algorithms and protocols that are subsequently used.

In a step E4, the distribution entity 20 receives the requested signature from the proxy entity 30. In a particular embodiment, in which the distribution entity 20 has not previously received a certificate, for example in step D3 described above, the signature is received with the accompaniment of the certificate issued to the entity at the source of the content. This signature corresponds more precisely to the encryption, by means of the private key associated with the entity at the source of the content, of the hash (in English) of a message obtained using a "hash" function (e.g. MD5 or SHA) that is common to the distribution entity 20 and the client entity 1000, and negotiated at the time of the Hello message.

In a step E5, the public encryption key associated with the entity at the source of the content is sent to the client entity 1000 by the distribution entity 20.

The signature, received in step E4, is likewise sent to the client entity 1000 by the distribution entity 20 in a step E6. The integrity of the distribution entity 20 is then guaranteed to the client entity.

Steps E1 to E6 allow the provision of a guarantee of the integrity of the transmitter of the content, but they do not allow the confidentiality of the interchange to be assured, however. The obtainment of this confidentiality is the subject of steps E7 to E10.

In a step E7, the distribution entity 20 receives an encrypted generation key from the client entity 1000. In the embodiment described, this is an RSA key (for "Rivest, Shamir, Adleman"). This key (known by the name of premaster secret in RFC 5246), previously encrypted by the client entity 1000 using the public encryption key, can be decrypted only by means of the private key associated with the entity at the source of the content.

The encrypted generation key received in step E7 is then sent by the distribution entity 20 to the proxy entity 30 in a step E8 so that the latter decrypts it by means of the private key.

The distribution entity 20 receives the decrypted generation key from the proxy entity 30 in a step E9.

From this generation key received from the proxy entity 30, the distribution entity 20 computes symmetrical session keys in a step E10, which are used to encrypt the interchanges that follow with the client entity 1000. The latter has likewise computed, for its part, the symmetrical session keys. The requested content can then be distributed in total confidentiality (step E11).

In another embodiment, step E2 is not implemented, in which case each HTTPS access request for a content that is received from the distribution entity 20 is presumed to require the services of a proxy entity 30.

In yet another embodiment, steps E5 and E6 are performed simultaneously. By way of example, the public encryption key and the signature are sent by means of a certificate referred to as "signed", which has these two elements at the same time.

It should likewise be noted that if the distribution entity 20 already has a certificate with the public key, step E5 is not implemented.

When only an integrity guarantee for the transmitter is requested in order to set up a secure interchange, that is to say that confidentiality of the interchange is not required, steps E7 to E10 are not implemented.

The method for distributing a content can likewise be adapted to implement cascaded delegation (step E12) as illustrated in FIG. 1b. In this configuration, the signature request sent by the distribution entity 20 in step E3 is transmitted to an entity playing the part of a relay entity. The signature request is then relayed from one relay entity to another relay entity, until one of them is capable of responding to the request by signing by means of the private key associated with the entity at the source of the requested content. In this variant, at the distribution entity 20, reception of the signature is unchanged except for the fact that it is received by means of a plurality of relay entities.

The request for decryption of the generation key may in the same way be relayed to an entity having the private key (step E13).

It can be seen that in these variant embodiments, the distribution entity does not have the private key and calls upon the proxy entity for all cryptographic processing operations requiring the private key. This allows the private key not to be broadcast. Moreover, no modification is required at the client entity.

Figure 5A:
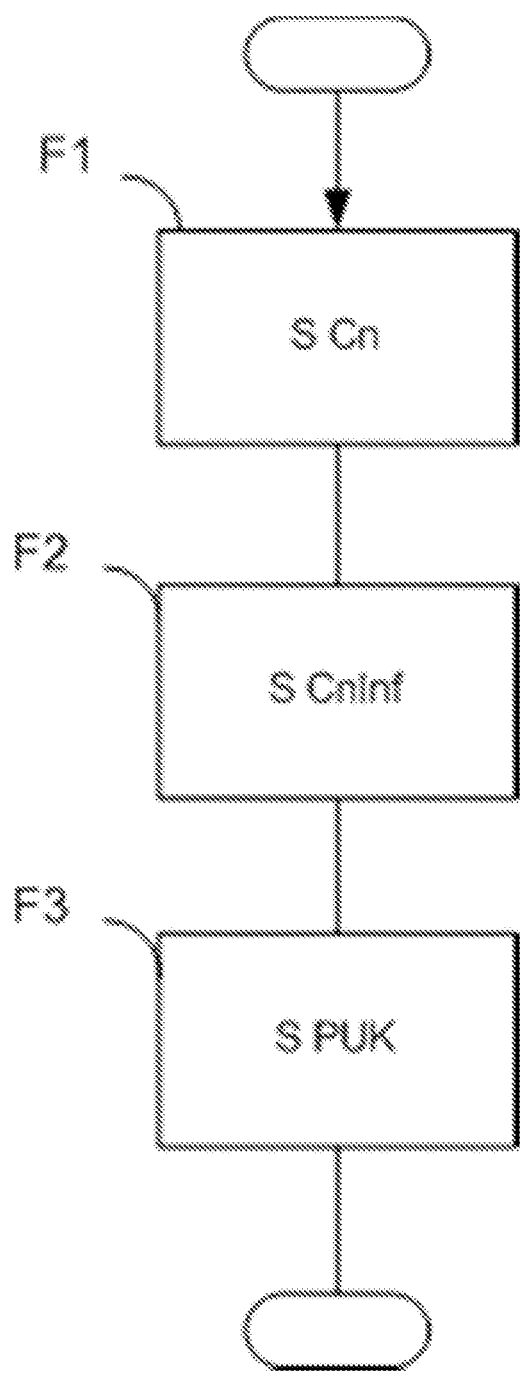
FIGS. 5a and 5b show steps of a method for delegation in a particular embodiment.
Figure 5B:
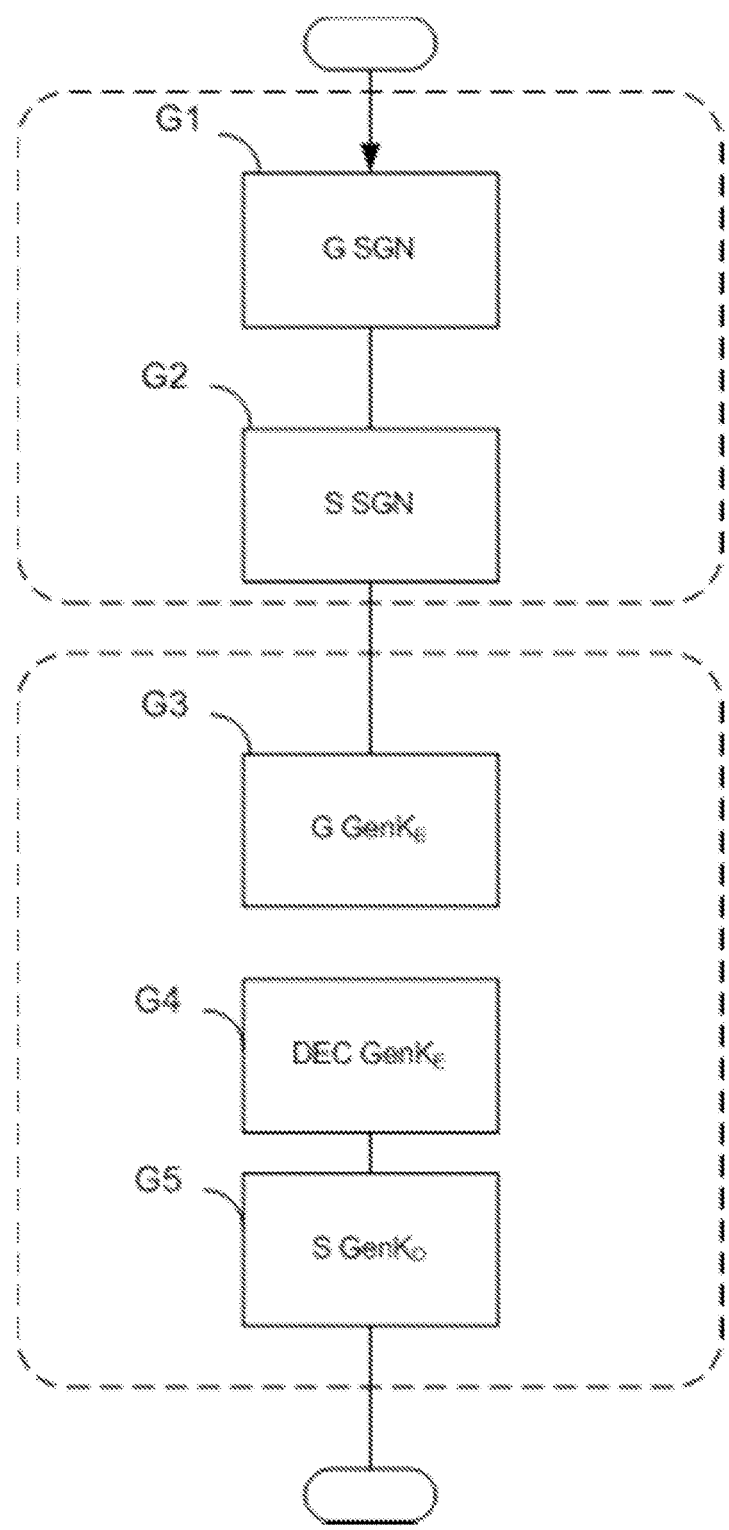

The invention likewise concerns a method for delegation that is implemented by a proxy entity 30. The method for delegation will be better understood from FIGS. 5a and 5b.

In a step F1, the proxy entity 30 sends a content Cn to an entity of a content distribution network. In association with the content Cn, a processing information item for the content is likewise sent in a step F2. This processing information item identifies the content as requiring processing operations requiring the use of a private key for distributing it. In a step F3, the proxy entity 30 sends the public encryption key associated with its private key. By way of example, the public encryption key is transmitted by means of an electronic certificate compliant with the X.509 standard.

It should be noted that in another embodiment, steps F1, F2 and F3 are optional. Steps F1, F2 and F3 allow distribution entities 20 to be presupplied with content that is capable of being distributed to client entities with a piece of information indicating whether this content needs to be the subject of a secure interchange.

In a step G1, the proxy entity 30 receives a request for signature of at least one datum by means of the private key associated with the entity at the source of the content Cn. The signature request is sent by means of an HTTPS request, for example.

The proxy entity 30 then responds to this signature request in a step G2. If the proxy entity 30 would not previously have sent a certificate during step F3 outlined above, the signature is sent with the accompaniment of the certificate issued to the entity at the source of the content. As indicated above for the distribution entity 20, this signature corresponds to the encryption, by means of the private key associated with the entity at the source of the content, of the hash of a message, which is obtained using a hash function negotiated during a Hello message. The proxy entity 30 thus certifies the integrity of the distribution entity.

Steps G3 to G5 relate more particularly to the confidentiality of interchanges between entities. In a step G3, the proxy entity 30 receives an encrypted generation key from the distribution entity 20. This is an RSA key as described above.

This generation key is then decrypted by means of the private key that the proxy entity 30 has (step G4).

The generation key is finally returned in decrypted form to the distribution entity 20 in a step G5. This generation key is then used by the distribution entity 20, which uses it to compute session keys that are used to encrypt the interchanges that will take place with the client entity 1000. The confidentiality of the interchanges is thus assured.

If the proxy entity 30 were already to have a certificate with the public key, step F3 is unnecessary.

Moreover, when only a guarantee of integrity of the transmitter is requested for setting up a secure interchange, but the confidentiality of the interchange is not required, only steps G1 to G2 are necessary, and the other steps can be omitted.

In the embodiment described, a relationship of trust between the proxy entity 30 and the distribution entity 20 is moreover established prior to the data interchanges between these two entities. The data that are sent by the proxy entity 30 in response to the signature request (step G2) and to the decryption request (step G5) of the distribution method are thus transmitted in a totally secure manner. This relationship of trust is an HTTPS session, for example.

The invention has been described with an implementation based on the HTTPS protocol. However, there is no limiting nature in respect of the technologies for secure interchange that are used. The invention can notably be implemented on top of all protocols using SSL/TLS, for example the secure versions of FTP, SMTP, POP, IMAP.

The invention is implemented by means of software and/or hardware components. With this in mind, the term "module" can correspond in this document either to a software component or to a hardware component, or to a set of hardware and/or software components, that is capable of implementing a function or a set of functions, according to what is described above for the module in question.

A software component corresponds to one or more computer programs, one or more subroutines of a program or, more generally, to any element of a program or of a piece of software. Such a software component is stored in memory and then loaded and executed by a data processor of a physical entity and is capable of accessing the hardware resources of this physical entity (memories, recording media, communication buses, electronic input/output cards, user interfaces, etc.).

In the same way, a hardware component corresponds to any element of a hardware assembly (or hardware). It may be a programmable or nonprogrammable hardware component, with or without an integrated processor for executing software. By way of example, it is an integrated circuit, a chip card, an electronic card for executing firmware, etc.

In one particular embodiment, the modules 200, 202, 208, 210 are designed to implement the method for distributing a content that is described above. They are preferably software modules comprising software instructions for executing the steps of the method for distribution described above, which are implemented by the distribution entity. The invention therefore also concerns:

a program for an entity for distributing a content, comprising program code instructions intended to control the execution of the steps of the method for distributing a content described above when said program is executed by said entity;

a recording medium that can be read by an entity for distributing a content on which the program for an entity for distributing a content is recorded.

Equally, the modules 300, 306 are designed to implement the method for delegation described above. They are preferably software modules comprising software instructions for executing the steps of the method for delegation described above, which are implemented by the proxy entity. The invention therefore also concerns:

a program for a proxy entity, comprising program code instructions intended to control the execution of the steps of the method for delegation described above when said program is executed by said entity;

a recording medium that can be read by a proxy entity on which the program for a proxy entity is recorded.

The software modules can be stored in or transmitted by a data medium. This may be a hardware storage medium, for example a CD-ROM, a floppy disk or a hard disk, or else a transmission medium such as an electrical, optical or radio signal, or a telecommunication network.

The invention claimed is:

1. A method for distributing, a content that is provided by a source entity whose integrity is guaranteed by means of a source entity's private key confined in a first content distribution subnetwork, said method comprising the following steps implemented by a distribution entity (20) for distributing a content belonging to a second content distribution subnetwork not possessing the source entity's private key, in a content distribution network comprising the first and the second content distribution subnetworks:
   reception (E1) by the distribution entity (20) belonging to the second content distribution network of an access request for said content from a client entity;
   sending (E3), to a proxy entity (30) belonging to the first content distribution subnetwork, of a request for signature of at least one datum by means of the source entity's private key, said request relating to the distribution of the content to the client entity;
   reception (E4) of said at least one signed datum, said at least one signed datum certifying the integrity of said distribution entity (20) for the client entity;
   sending (E5) of a source entity's public encryption key associated with the source entity's private key to the client entity;
   sending (E6) of said at least one signed datum to the client entity and distribution (E11) of the content to the client entity.

2. The method of distribution as claimed in claim 1, moreover comprising the following steps:
   reception (D1) of said content and of said source entity's public encryption key (D3) for subsequent distribution of said content;
   reception (D2) of a processing information item associated with said content indicating that the processing operations requiring the source entity's private key are performed by said proxy entity (30).

3. The method of distribution as claimed in claim 1, moreover comprising the following steps:
   reception (E7) of a generation key encrypted by means of said source entity's public encryption key from the client entity;
   sending (E8) of said generation key to be decrypted to said proxy entity (30);
   reception (E9) of said decrypted generation key from said proxy entity (30);
   generation (E10) of at least one session key from said generation key, said at least one session key being intended to be used to provide security for interchanges between said distribution entity (20) and said client entity.

4. A method as claimed in claim 1, comprising the following steps implemented by the proxy entity (30):
   reception (G1), from the distribution entity (20), of a content of a request for signature of at least one datum by means of said source entity's private key, said request relating to distribution of the content to the client entity;
   sending (G2), to the distribution entity (20), of said at least one signed datum, said at least one signed datum certifying the integrity of said entity for distributing a content (20) for the client entity and being intended to be sent to the client entity.

5. A method as claimed in claim 4, moreover comprising establishment of a relationship of trust with between the proxy entity and the distribution entity (20) for distributing a content prior to the sending (G2) of said at least one signed datum.

6. A non-transitory computer-readable medium including computer program code instructions that, when executed by a distribution entity (20) for distributing a content, are programmed to execute the method according to claim 1.

7. A distribution entity (20) for distributing a content, said content being provided by a source entity whose integrity is guaranteed by means of a source entity's private key, said distribution entity (20) belonging to a second content distribution subnetwork not possessing the source entity's private key, in a content distribution network comprising the first and the second content distribution subnetworks, and comprising:
   a first sending/receiving module (200), designed to receive an access request for a content from a client entity, and to send said client entity a source entity's public encryption key, and at least one signed datum in order to distribute the content to said client entity;
   a second sending/receiving module (202), designed to send a proxy entity (30) belonging to the first content distribution subnetwork a request for signature of said at least one datum by means of the source entity's private key confined in the first content distribution subnetwork, and to receive said at least one signed datum in response to said request, said at least one signed datum certifying the integrity of said distribution entity (20) for distributing a content for the client entity.

8. The distribution entity (20) for distributing a content as claimed in claim 7, in which said second sending/receiving module (202) is likewise designed to receive, from an entity belonging to a content distribution network, a content and a processing information item for said content, as well as at least one source entity's public encryption key.

9. The distribution entity (20) for distributing a content as claimed in claim 7, in which
   said first sending/receiving module (200) is moreover designed to receive from a client entity an encrypted generation key;
   said second sending/receiving module (202) is moreover designed to send said encrypted generation key to the proxy entity (30) for decryption;
   said entity moreover comprising:
      a computation module (208), designed to generate at least one session key from said generation key, said at least one session key being intended to be used in order to provide security for interchanges with the client entity.

10. A system (40) in a content distribution network, said system (40) comprising:
   at least one distribution entity (20) for distributing a content as claimed in claim 7; and
   a proxy entity (30), storing in memory a source entity's private key guaranteeing the integrity of a source entity providing a content, said proxy entity comprising a sending/receiving module (300), designed to receive, from the entity for distributing a content (20), a request for signature of at least one datum by means of said source entity's private key, said request relating to distribution of the content to a client entity, and to send to said distribution entity (20) said at least one signed datum, said at least one signed datum certifying the integrity of said distribution entity (20) for the client entity and being intended to be sent to the client entity.

* * * * *